United States Patent [19]

Dahl et al.

[11] Patent Number: 4,982,278

[45] Date of Patent: Jan. 1, 1991

[54] BINOCULAR STEREOVISION

[76] Inventors: Thomas R. Dahl, 2156 Montecito Rd., Ramona, Calif. 92065; George Spector, 233 Broadway #3815, New York City, N.Y. 10007

[21] Appl. No.: 432,362

[22] Filed: Nov. 6, 1989

Related U.S. Application Data

[63] Continuation-in-part of Ser. No. 311,039, Feb. 15, 1989, Pat. No. 4,933,755.

[51] Int. Cl.$^5$ ............................................. H04N 13/00
[52] U.S. Cl. ......................................... 358/88; 358/91; 358/92; 350/133
[58] Field of Search ......................... 358/88, 91, 92, 3; 350/133

[56] References Cited

U.S. PATENT DOCUMENTS

| | | | |
|---|---|---|---|
| 2,955,156 | 10/1960 | Helig | 358/88 |
| 4,021,846 | 5/1977 | Roese | 358/92 |
| 4,310,849 | 1/1982 | Glass | 358/88 |
| 4,395,731 | 7/1983 | Schoolman | 358/88 |
| 4,636,866 | 1/1987 | Hattori | 358/236 |
| 4,805,988 | 2/1989 | Dones | 350/133 |

Primary Examiner—John K. Peng

[57] ABSTRACT

A binocular/goggle stereo vision device is provided which when worn on the head of a person will send stereoscopic images and stereophonic sounds directly to the eyes and ears of the person. The stereoscopic images are carried by a pair of liquid crystal displays while the stereophonic sounds are carried by a pair of earphones.

2 Claims, 2 Drawing Sheets

BINOCULAR STEREOVISION

This is a continuation in part of patent application Ser. No. 311,039 filed Feb. 15, 1989 now U.S. Pat. No. 4,933,755.

BACKGROUND OF THE INVENTION

This application is an improvement over the preceding copending application, wherein binoculars/goggles are provided with the stereo vision. The instant invention relates generally to individual image display systems and more specifically it relates to a binocular/goggle stereo vision device which provides stereoscopic images and sounds directly to the eyes and ears of a person wearing the device on the head.

There are available various conventional display systems which do not provide the novel improvements of the invention herein disclosed.

SUMMARY OF THE INVENTION

A primary object of the present invention is to provide a binocular/goggle stereo vision device that will overcome the shortcomings of the prior art devices.

Another object is to provide a binocular/goggle stereo vision device which when worn on the head of a person will send stereoscopic images and stereophonic sounds directly to the eyes and ears of the person.

An additional object is to provide a binocular/goggle stereo vision device in which the stereoscopic images are carried by a pair of liquid crystal displays while the stereophonic sounds are carried by a pair of earphones.

A further object is to provide a binocular/goggle stereo vision device that is simple and easy to use.

A still further object is to provide a binocular/goggle stereo vision device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 9:
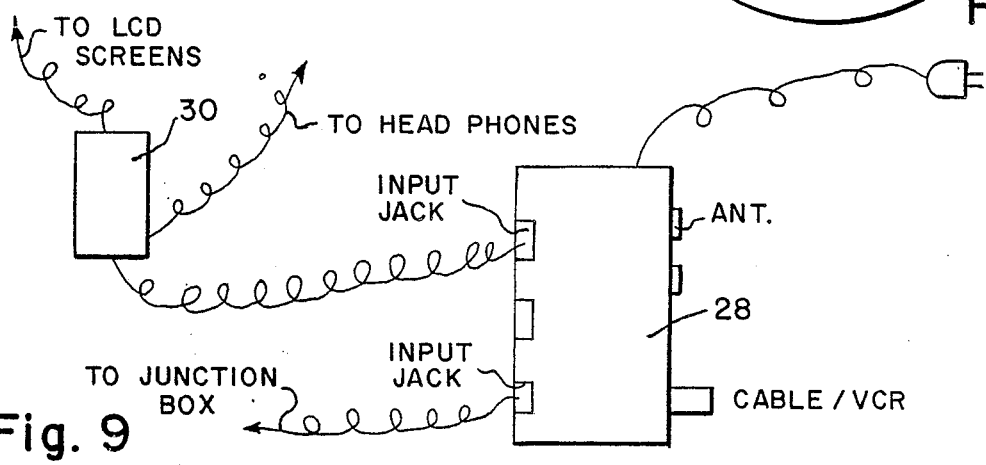
FIG. 9 is a side view of the receiver/power supply system.

Turning now descriptively to the drawings, in which similar reference characters denote similar elements throughout the several views, FIGS. 1 through 8 illustrates a stereo vision device 10 consisting of a band member 12 adapted to be worn on the head 14 of a person. An optical unit 18 is carried on the band member 12 and adapted to be used by both eyes 20 of the person 16. A pair of liquid crystal displays 22 is disposed in a side by side relationship in the optical unit 18. Each of the displays 22 is adapted to receive one portion of stereoscopic images and disposed along a line of sight associated with one of the eyes 20 of the person 16 so as to supply three dimensional images to the eyes. A pair of earphones 24 are provided in which each of the earphones 24 is carried on the band member 12 adjacent to an ear 26 of the person 16 to receive one portion of stereophonic sounds. A remote receiver/power supply pack 28 as shown in FIG. 9, is for receiving stereo video signals and sending the stereoscopic images, via a junction box 30, to the liquid crystal displays. The pack 28 also is for receiving stereo audio signals and sending the stereophonic sounds to the earphones 24 via the junction box 30.

Figure 1:
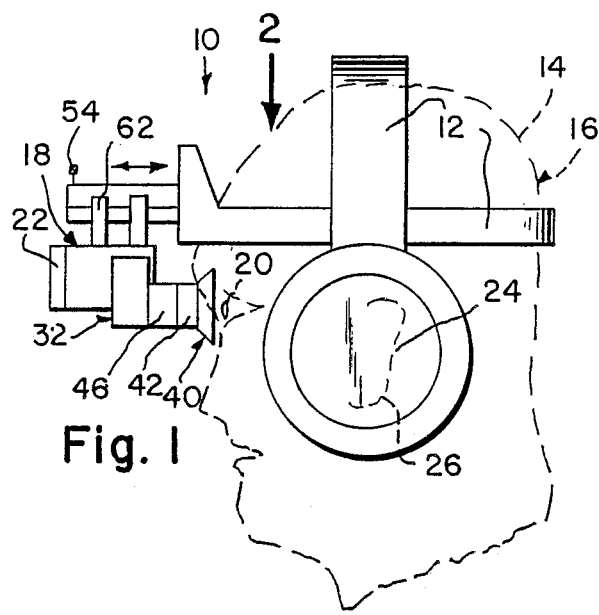
FIG. 1 is a side view of a binocular stereo vision device.
Figure 2:
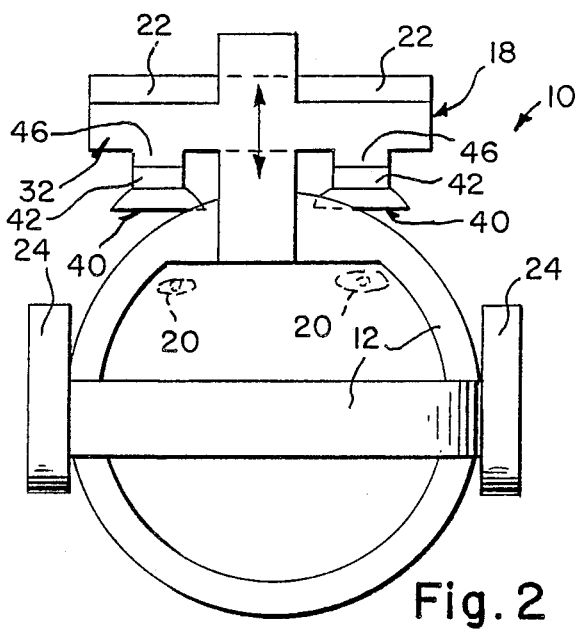
FIG. 2 is a top view as indicated by arrow 2 in FIG. 1.

The optical unit 18 in FIGS. 1 and 2 is a pair of binoculars 32 while the optical unit 18 in FIGS. 3 through 8 is a pair of goggles 34. The pair of goggles 34 includes a pair of convex lenses 36. Each of the lenses 36 is disposed between one of the respective liquid crystal displays 22 and one of the eyes 20 of the person 16 so as to enlarge size of the stereoscopic images to the eyes 20. A pair of prisms 38 can also be provided as shown in FIGS. 5 through 8. Each of the prizing 38 is disposed between one of the respective lenses 36 and one of the eyes 20 of the person 16 so as to focus the stereoscopic images into the eyes.

Figure 5:
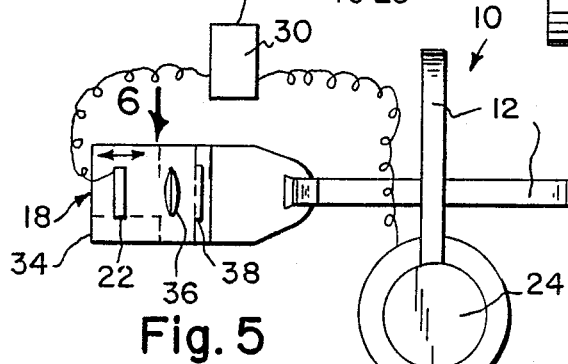
FIG. 5 is a side view of a second type of goggle stereo vision device.
Figure 6:
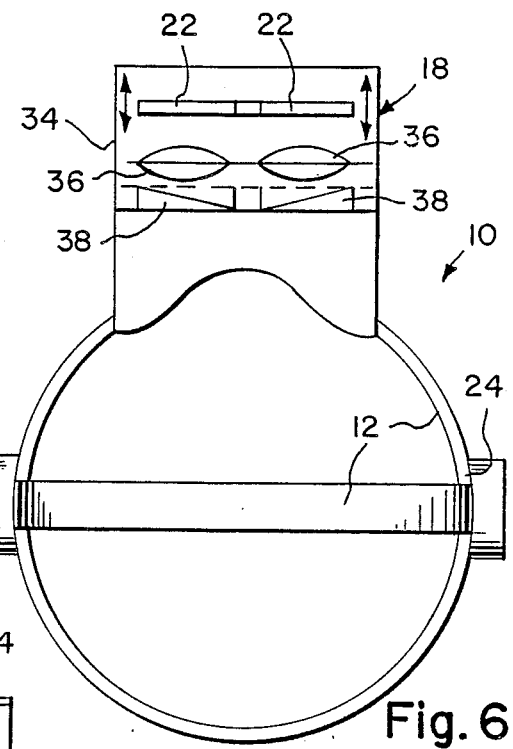
FIG. 6 is a top view as indicated by arrow 6 in FIG. 5.
Figure 8:
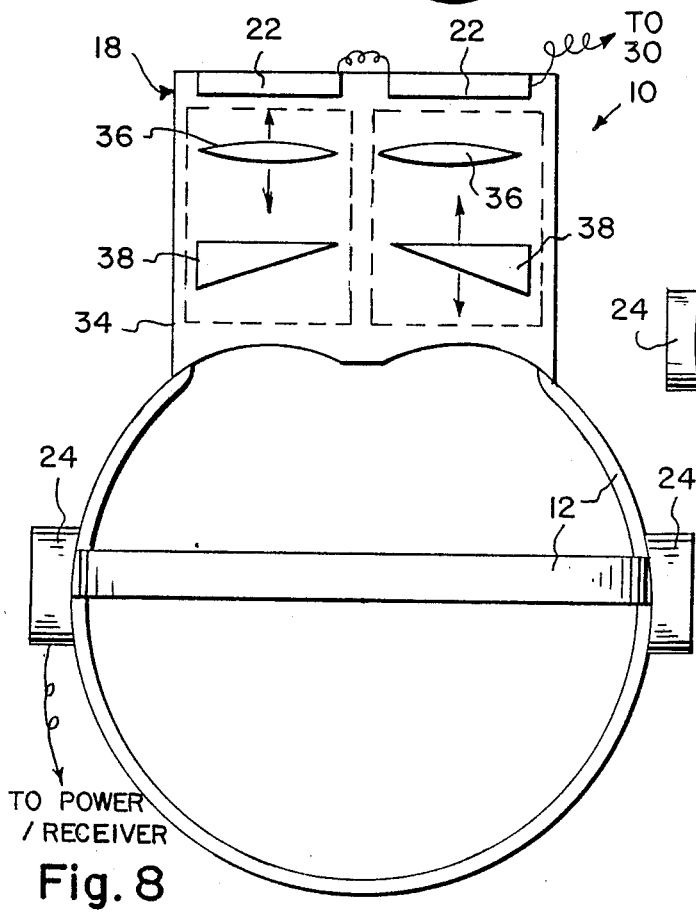
FIG. 8 is a top view similar to FIG. 6 of a fourth type of goggle stereo vision device.
Figure 7:
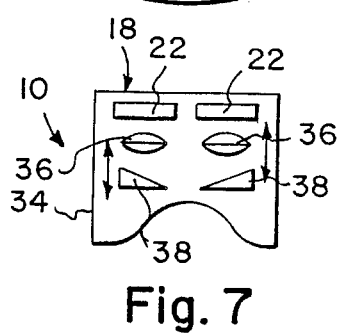
FIG. 7 is a top view of just the goggle assembly of a third type of goggle stereo vision device.

The liquid crystal displays 22 in FIGS. 5 and 6 can be adjustable, the lenses 36 in FIGS. 3, 4, 7 and 8 can be adjustable, while the prisms 38 in FIGS. 7 and 8 can be adjustable.

Alternately by imposing a time delay to the reception of a similar image to one L.C.D. 22, three dimensional images can be provided.

Figure 10:
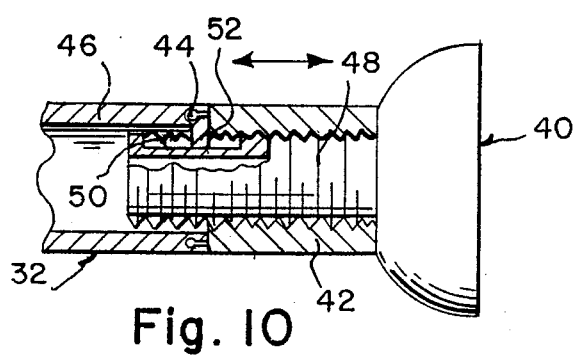
FIG. 10 is a cross sectional detailed view of the adjustable mechanism for one of the eye pieces in the binocular stereo vision device.

The binocular 32, in FIGS. 1 and 2, have a pair of adjustable eye pieces 40. Each eye piece 40, as best seen in FIG. 10, includes an internally threaded sleeve 42 to rotatably mount at 44 to housing 46 of the binoculars 32. An externally threaded hollow shank 48 is engagably carried within the sleeve 42. The shank 48 has a longitudinally slot 50 therein. A finger 52 extends internally from the housing 46 into the slot 50 in the shank 48 to prevent the shank 48 from rotating with the sleeve 42 but allows the shank 48 to move in and out with respect to the housing 46.

Figure 11:
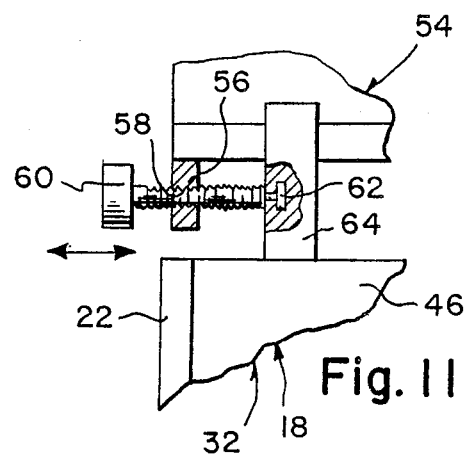
FIG. 11 is a detailed side view with parts broken away of an adjustable mechanism for the track of the binocular assembly in FIGS. 1 and 2.
Figure 3:
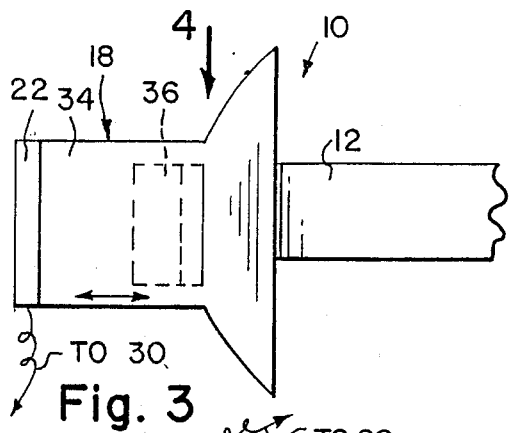
FIG. 3 is a side view of a goggle stereo vision device with parts broken away.
Figure 4:
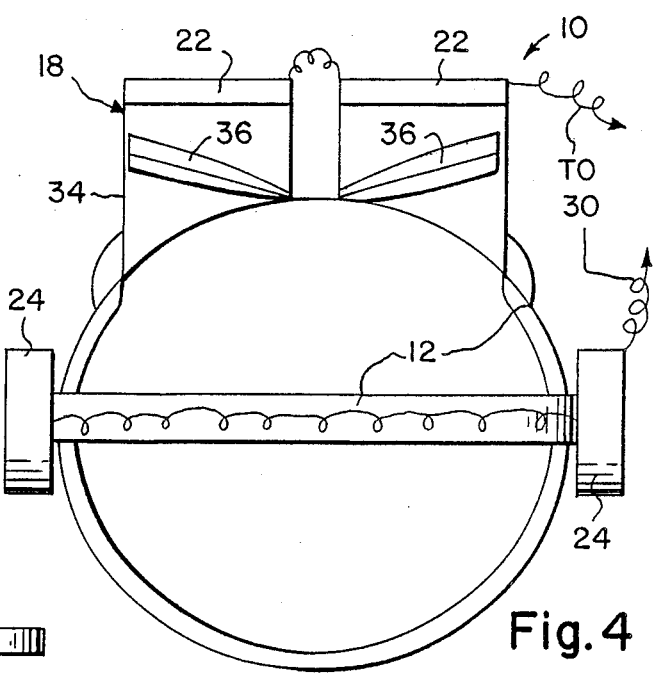
FIG. 4 is a top view as indicated by arrow 4 in FIG. 3.

As shown in FIG. 1, the housing 46 is adjustable with respect to the band member 12 by a track assembly 54. As shown in FIG. 11, a stationary arm member 56 extends downwardly from end of the track assembly 54. The arm member 56 has a threaded hole 58 therethrough. A screw 60 is swivelly connected at 62 to a movable track arm 64 of the track assembly 54 and threadably extends through the threaded hole 58. When the screw 60 is rotated the track arm 64 will move on the track assembly 54 for a fine adjustment for the binoculars 32.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A stereo vision device which comprises:
   (a) a band member adapted to be worn on the head of a person;
   (b) an optical unit carried on said band member and adapted to be used by both eyes of the person;
   (c) a pair of liquid crystal displays disposed in a side by side relationship in said optical unit, each of said displays adapted to receive one portion of stereoscopic images and disposed along a line of sight associated with one of the eyes of the person so as to supply three dimensional images to the eyes;
   (d) a pair of earphones, each of said earphones carried on said band member adjacent to an ear of the person to receive one portion of stereophonic sounds; and
   (e) a remote receiver/power supply pack for receiving stereo video signals and sending the stereoscopic images to said liquid crystal displays and receiving stereo audio signals and sending the stereophonic sounds to said earphones, wherein said optical unit is a pair of binoculars with a pair of adjustable eye pieces in which each said eye piece includes:
   (f) an internally threaded sleeve rotatably mounted to housing of said binoculars;
   (g) an externally threaded hollow shank engagably carried within said sleeve, said shank having a longitudinal slot therein; and
   (h) a finger extending internally from the housing into the slot in said shank to prevent said shank from rotating with said sleeve but allowing said shank to move in and out with respect to the housing.

2. A stereo vision device which comprises:
   (a) a band member adapted to be worn on the head of a person;
   (b) an optical unit carried on said band member and adapted to be used by both eyes of the person;
   (c) a pair of liquid crystal displays disposed in a side by side relationship in said optical unit, each of said displays adapted to receive one portion of stereoscopic images and disposed along a line of sight associated with one of the eyes of the person so as to supply three dimensional images to the eyes;
   (d) a pair of earphones, each of said earphones carried on said band member adjacent to an ear of the person to receive one portion of stereophonic sounds; and
   (e) a remote receiver/power supply pack for receiving stereo video signals and sending the stereoscopic images to said liquid crystal displays and receiving stereo audio signals and sending the stereophonic sounds to said earphones, wherein said optical unit is a pair of binoculars with a pair of adjustable eye pieces in which each said eye piece includes:
   (f) an internally threaded sleeve rotatably mounted to housing of said binoculars;
   (g) an externally threaded hollow shank engagably carried within said sleeve, said shank having a longitudinal slot therein; and
   (h) a finger extending internally from the housing into the slot in said shank to prevent said shank from rotating with said sleeve but allowing said shank to move in and out with respect to the housing wherein the housing of said binoculars is adjustable with respect to said band member by a track assembly; and
   (i) a stationary arm member extending downwardly from end of the track assembly and threadably extending through the threaded hole so that when said screw is rotated the track arm will move on the track assembly for a fine adjustment for said binoculars.

* * * * *